April 7, 1925.
R. C. BARBOUR
FISHING TOOL
Filed Oct. 28, 1924
1,532,979
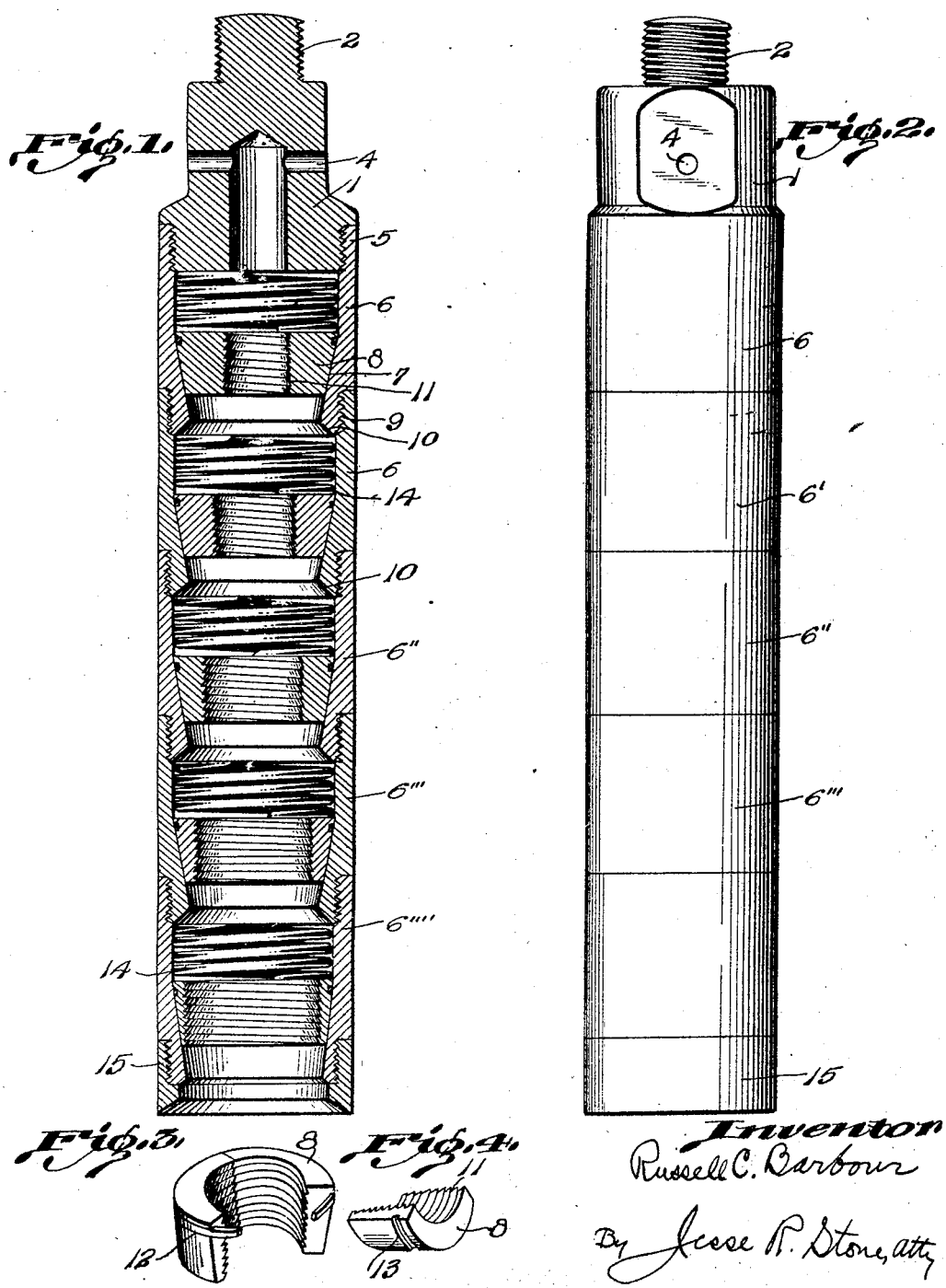

Patented Apr. 7, 1925.

1,532,979

UNITED STATES PATENT OFFICE.

RUSSELL CLYDE BARBOUR, OF CORSICANA, TEXAS.

FISHING TOOL.

Application filed October 28, 1924. Serial No. 746,334.

*To all whom it may concern:*

Be it known that I, RUSSELL CLYDE BARBOUR, a citizen of the United States, residing at Corsicana, Navarro County, Texas, have invented a certain new and useful Improvement in Fishing Tools, of which the following is a specification.

My invention relates to fishing tools for use in removing broken rods, pipe, and the like from wells. It relates particularly to devices of the overshot type acting to telescope over the upper end of broken objects and to automatically grip them so that they may be removed from the well.

It is an object of the invention to provide a fishing tool employing gripping means of different sizes adapted to engage with objects of different diameter so that said objects may be removed from the well. It is also desired that the gripping means be held positively in engagement with the objects which are to be removed so that there will be no tendency of the gripping means to release the hold upon the said objects.

Referring to the drawing herewith, wherein a preferred form of the invention is disclosed, Fig. 1 is a central longitudinal section through a fishing tool embodying my invention. Fig. 2 is a side elevation of the same, and Fig. 3 is a perspective view of two of the slips employed in the construction of the device, and Fig. 4 is a similar perspective view of one of the jaws separately removed. Like numerals of reference are employed to designate like parts in all the views.

In the construction of the device I contemplate using a plurality of gripping means, one above the other, and decreasing in interior diameter from the lower toward the upper end so that both large and small objects may be gripped by the same fishing tool. In carrying out this idea I employ a head 1 having a threaded shank 2 thereon, whereby it may be engaged with an operating rod or pipe extending upwardly to the surface. The head 1 has a central channel 3 therein extending from the lower end upwardly about midway of its length. The upper end of said channel or recess connects with a plurality of branching passages 4 leading to the outside of the head. The lower end of said head is threaded at 5 for engagement with a tubular section 6, the interior diameter of which is inclined or tapered downwardly at 7 to form a seat for a plurality of jaws or slips 8 also tapered to fit therein. The lower end of the section 6 is threaded externally at 9 for engagement with a second tubular section 6' identical in general construction with the section 6. Below the section 6' are other sections 6''' and 6'''' all of the same external and internal diameter. The lower ends of each of the sections referred to is beveled outwardly at 10 on the internal diameter so as to better guide the broken rod or pipe into the section where it is to be gripped.

The slips or jaws 8 which fit within the seats provided in each of the sections, are alike in general structure except that the upper jaws are thicker than each of the jaws in the slips below it. The passage furnished through each of the succeeding sets of jaws thus decreases uniformly in diameter from the lower end upwardly so that if the object is not gripped by the first set, it may continue passing upwardly until it is tightly gripped by one of the sets of jaws above the lower one.

Each set of jaws may include any desired number of jaws toothed at 11 on their inner faces to grip the object being fished for. The teeth are upwardly inclined to serve this purpose. The jaws are partially held together by sectional rings 12 fitting within outer annular recesses 13 in each set of slips. It is contemplated that although the rings 12 are sectional, the ends of the sections forming the ring will be staggered relative to the openings between each of the slips. In this way the slips will be held together while in operative position, all in the same uniform horizontal position.

It has been found in the operation of slips in tools of this kind that there must be some means of holding the slips downwardly in contracted position, and an important feature of my invention is the provision of springs 14 above each set of jaws, said springs being under compression and tending to force the jaws downwardly. The upper end of each spring bears against the base of the tubular section above it, the lower end bearing upon the upper surface of the jaws.

At the lower end of the series of sections 6, 6', etc., I contemplate using a guide shoe 15 to protect the lower end thereof and to assist in guiding the rod or pipe into the fishing tool.

In the operation of this device, the tool is inserted downwardly into the well to engage with some elongated pipe, rod, or other tool, to grip the same so that it may be removed from the well. The upper end of the piece of junk thus to be seized will pass upwardly within the interior of the tool until the said object is firmly gripped by one of the sets of jaws, and in thus passing upwardly into the tool, the jaws against which the end of the pipe or rod contacts will force the jaws upwardly against the action of the springs until a point is reached where the pipe can pass no further. In that position the pipe will be firmly gripped by one of the sets of jaws and this grip will be of a positive nature, due to the action of the spring 14. There will be no tendency thereafter for the jaws to be moved upwardly in their seats so as to allow the object to become loosened. The action will be a positive one tending to maintain a firm hold upon the broken object so that it may be withdrawn without danger of dropping thereafter. The employment of the spring will serve as a safety measure so that no accidental loosening of the pipe while being removed may take place.

Further objects and advantages of the invention will be apparent to those skilled in the art.

What I claim as new and desire to protect by Letters Patent is:

1. In a fishing tool, a head, a plurality of connected tubular sections secured in stages below said head, the inner face of each section being tapered inwardly to form a seat, sets of jaws tapered to fit each said seat, and a coiled spring above each set of jaws acting to press said jaws resiliently downwardly.

2. In a fishing tool, a head, a plurality of connected tubular sections secured in stages below said head, a tapered seat formed on the inner surface of each section, toothed jaws fitting within each said seat, said jaws being of decreasing thickness in each set from the upper set downwardly, and resilient means holding said jaws downwardly in their seats.

In testimony whereof I hereunto affix my signature this 24th day of October, A. D. 1924.

RUSSELL CLYDE BARBOUR.